Patented Feb. 13, 1940

2,189,817

UNITED STATES PATENT OFFICE 2,189,817

COLOR-FORMING PHOTOGRAPHIC COMPOSITION, ELEMENT, AND PROCESS

Lynn Barratt Morris, Washington, D. C., assignor to Du Pont Film Manufacturing Corporation, New York, N. Y., a corporation of Delaware No Drawing. Application March 13, 1939, Serial No. 261,651

11 Claims. (Cl. 95—6)

This invention relates to photography, more particularly it relates to color-former compounds for use in photographic emulsions, still more particularly it relates to photographic elements bearing an emulsion layer which develops to form a dyed image and metallic silver in admixture with each other.

An object of this invention is to provide a class of water-insoluble dye forming bodies or color-formers which yield colored dyes simultaneously and in situ with photographic development. A further object is the preparation of novel dyes in color-forming development. A further object is to prepare such aforedescribed dyes which do not migrate from layer to layer or from the photographic element into the processing baths. A further object is to prepare photographic emulsions having dispersed therein the aforedescribed color formers. A still further object is to prepare multilayer photographic elements having at least one light-sensitized emulsion layer bearing a color-former which will couple with the oxidation products of aromatic amino developing agents to form a stable immobile dye. Still other objects will appear hereinafter.

The above and other objects are accomplished by the use in color photography of the alicyclic mono ethers of polyhydroxy phenols having a reactive position ortho or para to a hydroxyl group. In a more limited sense they are accomplished by the use in sensitized photographic emulsions of the saturated alicyclic mono ethers of mononuclear dihydric phenols having a reactive position ortho or para to the hydroxyl group.

The ethers of this invention have the general formula: R—O—R' wherein R is an alicyclic hydrocarbon radical which may be substituted by halogen, hydroxyl, alkoxy, alkyl, etc. groups, and R' is a hydroxy aryl radical which may be substituted by halogen, hydroxyl, alkoxy, alkyl, etc. groups, R, for example, may be a cyclopropyl, cyclobutyl, cyclopentyl, cyclohexyl, bromocyclohexyl, naphthenyl, chlornaphthenyl, menthyl, abietyl, dihydroabietyl, tetrahydroabietyl, etc. R', for example, may be hydroxy naphthyl, preferably α-hydroxy naphthyl, 2-bromo-1-hydroxynaphthyl, 2-chloro-1-hydroxynaphthyl, hydroxyphenyl, 2-chloro-3-hydroxyphenyl, 3-bromo-2-hydroxyphenyl, 4-methyl-3-hydroxyphenyl, 2-ethyl-3-hydroxy-phenyl, etc.

The color-forming ethers are incorporated in a photographic emulsion containing a photo-sensitive salt which may be coated upon a base or support in the usual manner. The color-former is incorporated in sufficient amount to form a dye with the oxidation products of aromatic amino developing agents of the proper tinctorial strength and density.

The color-forming ethers may also be dispersed with the aid of dispersing agents such as alkylated naphthalene sulfonic acids, sulfated higher alcohols, higher alkylsulfonic acids and their alkali metal salts, etc., Turkey red oil, etc., if necessary in developer solutions and emulsions. In the preferred embodiment of the invention, however, they are used in emulsions.

The invention will be further illustrated but is not intended to be limited by the following examples in which the parts stated are parts by weight:

Example I

Naphthenyl bromide was prepared by passing dry hydrogen bromide into 274 parts on naphthenyl alcohol for two hours at 130° C. One hundred thirty-seven parts naphthenyl bromide boiling at 150–160°/4 mm. was collected. Analysis for bromine, calcd. 23.74%; found 22.78%. Thirty-five parts of this was then dropped slowly into a refluxing mixture of 13 parts of resorcinol, 5.6 parts potassium hydroxide and 40.5 parts of dry n-butyl alcohol. After refluxing for three and one-half hours, the potassium bromide was filtered off and the butanol was steam distilled. Ether was added to the acidified mixture and the resorcinol was extracted with water. Removal of the diether was accomplished by extraction with 5% sodium hydroxide.

The resultant mononaphthenyl ether of resorcinol was coated in a gelatin silver halide emulsion and color developed with p-aminodiethylaniline. A blue color was formed. The compound is nonmigratory in the emulsion, being completely unaffected by leaching with 5% sodium carbonate solution.

Example II

The cyclohexyl ether of resorcinol prepared in a similar manner to that used in Example I from bromocyclohexane was coated in a gelatin silver halide emulsion and color developed with p-amino-diethylaniline. A blue color was formed which was similar in properties to the dye described in Example I.

Example III

The naphthenyl ether of pyrocatechol may be prepared after the manner described in Example I by substituting an equivalent amount of pyrocatechol for the resorcinol of that example.

The ether may be incorporated in an emulsion which may be coated upon a suitable photographic support such as paper or a cellulose derivative base, or upon another photographic emulsion layer which may or may not contain another color-forming dye component. After exposure in a camera or printing through appropriate color records the photgoraphic element may be color developed with p-aminodiethylaniline in the manner set forth in Example I to form a blue dye of good tinctorial strength.

In place of the specific ethers set forth in the preceding examples, any ether having the above specified chemical structure and properties may be substituted in similar amounts. Thus, suitable ethers may be prepared from naphthenic acids as starting materials which may contain from 6 to 18 or more carbon atoms may be used. The naphthenic acids may be catalytically reduced to alcohols, converted to bromides and then reacted to form ethers. Similarly, various alcohols such as cyclopropyl carbinol, cyclobutanol, cyclobutyl carbinol, cyclopentanol, fenchyl and iso-fenchyl alcohol, borneol and cholesterol, etc., may be converted to the corresponding bromides in the usual manner, which may then be reacted with the polyhydroxy phenols to form alicyclic ethers. As further examples of suitable ethers mention is made of the abietyl, dihydroabietyl and tetrahydroabietyl ethers of resorcinol and pyrocatechol, cyclohexyl ether of pyrocatechol, methyl cyclohexyl ether of pyrocatechol, etc.

The silver halide emulsions above described may form a single layer of a photographic element or may form one of a plurality of layers which may or may not contain another color-forming dye component. Alternatively, the silver halide emulsion may be coated on a plain or colored separating layer as one sensitive layer of a series of such layers on a monopack, multilayered film for use in color photography.

The photographic emulsions and emulsion layers may also contain the usual sensitizers such as the cyanine and carbocyanine salts and bases and the cyazines and carbocyazines salts and bases which are employed to extend the sensitivity of photographic emulsions.

In place of the specific aromatic amino developing agents of the above examples, others which may be used are the mono-, di- and tri-amino aryl compounds. The diamino aryl compounds such as para-phenylenediamine and its substitution products are preferred. These developers may be substituted in the ring with various groups, e. g. halogen, alkyl, alkoxy and aryl groups or in the amino groups with alkyl or aryl groups which in turn may be substituted, e. g. with halogen, hydroxyl, etc.

The preferred developing agents in the process of dye coupling development are derivatives of p-phenylenediamine and particularly the asymmetric dialkyl p-phenylenediamines, e. g., p-aminodimethylaniline, p-aminodiethylaniline, p-aminodibutylaniline, etc. Other developing agents which may be used include p-phenylendiamine itself, p-methylaminoaniline, p-ethylaminoaniline and p-aminophenol, N,N-diethyl-o-phenylene-diamine, chloro-p-phenylenediamine, 1,2,5-toluylenediamine, 2-amino-5-diethylaminotoluene, N-p-aminophenylpiperidine, N-methyl-N-hydroxyethyl-p-phenylene-diamine, N-butyl-N-hydroxyethyl-p-phenylenediamine, $\beta$-$\gamma$-dihydroxypropyl-p-phenylenediamine, etc. These aromatic amino-developing agents may be used in the form of their salts, which may be either inorganic or organic. The salts are in general more stable than the free bases. As examples of suitable salts mention is made of the hydrochloride, sulfates, acetates, etc.

Besides the above uses, these alicyclic ethers of polyhydroxy phenols may be applied in color photography processes where a uniformly dyed layer containing a silver image is differentially bleached with respect to the amount of silver present. In such a case, either before or after the formation of the silver image with a developer whose oxidation products do not couple with the color-forming ethers of this invention, a dye may be formed in the emulsion layer by treatment with diazo compounds or with a solution of a nitroso compound. Thus, the oxidation products of the p-phenylenediamine type of developer such as p-nitrosoaniline, p-nitrosodiethylaniline, p-nitrosodimethylaniline, etc. After a layer of dye is formed it is differentially bleached by treatment with a solution of stannous chloride and potassium bromide according to the process of Christensen (c. f. U. S. Pat. 1,517,049 and British Patent 133,034).

The above-described ethers may also be incorporated in gelatin layers and sensitized by treatment with potassium or ammonium bichromate. After appropriate exposure through a color separation record, the film may be developed in a paraphenylenediamine type of developer whereupon the chromium oxides formed by the exposure oxidize the developing agent and cause coupling with the ethers to form dye images. Another method is to develop the exposed bichromated colloid layer containing the alicyclic ethers with hot water to remove the soluble colloid wherever it was not exposed and then to form a dyed image by treatment with a solution containing a nitroso compound.

This case is related to Salzberg and White application, Serial No. 164,984, filed September 21, 1937. The use of the ethers of this invention has all of the advantages of that invention such as:

A. When incorporated in an emulsion layer they do not diffuse or migrate either in their dry state or when the film is subjected to bathing in water or alkaline solutions.

B. They will react with the oxidation products of developers during the reduction of silver halides to form dyes of such color-absorption and transmission characteristics as to make them particularly useful in multicolor photography processes for the production of colored images.

C. The dyes produced do not tend to migrate nor diffuse after their formation and have other advantages which are not possessed by the higher alkyl ethers of resorcinol; and additional advantages.

Among such advantages is the fact that substituent groups, e. g. halogen, nitro, amino, alkoxy, alkyl, etc., may be more easily placed in the alicyclic nuclei than in the long chain aliphatic nuclei. Thus, the shade of the dye or its solubility characteristics may be modified more easily or economically. The substituent groups may be placed in the alicyclic nuclei before or after the ether is made.

As many apparently widely different embodiments of this application may be made without departing from the spirit and scope thereof, it is to be understood that I do not limit myself to the specific embodiments hereof except as defined in the appended claims.

I claim:
1. A photographic emulsion comprising an ether of the general formula R—O—R' wherein

R is an alicyclic hydrocarbon radical, and R' is an aromatic hydrocarbon radical containing at least one hydroxyl group.

2. A color-forming photographic layer comprising a light-sensitive material and an ether of the general formula R—O—R' wherein R is an alicyclic hydrocarbon radical having at least 6 carbon atoms and R' is an aromatic hydrocarbon radical containing at least one hydroxyl group.

3. A color-forming photographic emulsion comprising a gelatino-silver halide emulsion and an ether of the general formula R—O—R' wherein R is an alicyclic hydrocarbon radical having at least 6 carbon atoms, and R' is a hydroxyaryl radical having at least one reactive position.

4. A color-forming photographic emulsion comprising a light-sensitive material and a naphthenyl ether of a polyhydroxyphenol having a reactive position.

5. A color-forming photographic emulsion comprising a light-sensitive material and an abietyl ether of a polyhydroxy phenol having a reactive position.

6. The process which comprises developing a photographic element bearing an emulson layer containing an exposed image in the presence of an ether of the general formula R—O—R' wherein R is an alicyclic hydrocarbon radical having at least 6 carbon atoms, and R' is a hydroxyaryl radical.

7. A photographic element comprising a base and at least one light sensitive silver halide emulsion layer imposed thereon, said layer containing as a color former an ether of the general formula: R—O—R' wherein R is an alicyclic hydrocarbon radical having at least 6 carbon atoms, and R' is a hydroxyaryl radical having at least one reactive position in a position taken from the group consisting of ortho and para to a hydroxyl group.

8. A color-forming photographic emulsion comprising a light sensitive silver halide and a cycloalkyl ether of a polyhydroxyphenol having a reactive position in a position taken from the group consisting of ortho and para to a hydroxyl group.

9. A color-forming photographc emulsion comprising a light sensitive silver halide and a cyclohexyl ether of resorcinol having a reactive position in a position taken from the group consisting of ortho and para to a hydroxyl group.

10. A color-forming photographic emulsion comprising a light sensitive slver halide and a naphthenyl ether of resorcinal having a reactive position in a position taken from the group consisting of ortho and para to a hydroxyl group.

11. A color-forming photographic emulsion comprising a light sensitive silver halide and an abietyl ether of resorcinol having a reactive position in a position taken from the group consisting of ortho and para to a hydroxyl group.

LYNN BARRATT MORRIS.